UNITED STATES PATENT OFFICE 2,477,870

METHOD OF PREPARING NITROALKANE SULFONATES

Marvin H. Gold and Leonard J. Druker, Chicago, Ill., assignors to The Visking Corporation, Chicago, Ill., a corporation of Virginia No Drawing. Application July 29, 1947,
Serial No. 764,591

8 Claims. (Cl. 260—513)

This invention relates to a method of preparing chemical compounds. More particularly, it relates to a new and improved method of preparing salts of $\beta$-nitroalkane sulfonic acids.

Recently there has been devised a process for preparing salts of $\beta$-nitroalkane sulfonic acids wherein a $\beta$-nitroalcohol is reacted directly with an aqueous solution of a bisulfite having a pH of at least 5.4.

The preparation of nitroalcohols by the now known procedures requires a relatively long period of time, such as 3 to 4 days, and furthermore the resulting nitroalcohols slowly undergo condensation and decomposition upon storage. Thus, it is uneconomical to store a nitroalcohol as a raw material.

An object of this invention is to provide a new and improved method of preparing salts of $\beta$-nitroalkane sulfonic acids.

Other and additional objects will become apparent hereinafter.

The objects of this invention are accomplished, in general, by reacting together a nitroalkane, an aldehyde, and an aqueous alkaline sulfite solution to produce the enol double salt of the desired $\beta$-nitroalkane sulfonate, and converting said enol salt to the $\beta$-nitroalkane sulfonate.

The details and manner of practicing the invention will become apparent by reference to the following specific examples, it being understood that these examples are merely illustrative embodiments of the invention and that the scope of the invention is not limited thereto.

Example I

A solution of potassium sulfite was prepared by dissolving 120 grams of potassium hydroxide in 150 milliliters of water and introducing sulfur dioxide gas until a pH of 6.5 was reached. Then 89 grams of 1-nitropropane was added to this solution with stirring. While stirring at 60° C., 81 grams of a 37% solution of formaldehyde was added. After 1 hour at 60° C., the resulting solution was cooled to room temperature and then was treated with sulfur dioxide until the pH was below 7. The crystalline product obtained was potassium-2-nitrobutane-1-sulfonate and it was separated by filtration. Fractional crystallization of the filtrate yielded more of the product.

Example II

A solution of sodium sulfite was prepared by dissolving 80 grams of sodium hydroxide in 250 milliliters of water and passing in sulfur dioxide gas until a pH of 8 was reached. Then 89 grams of 1-nitropropane was added to this solution with stirring. Then, while keeping the mixture at 40° C., 81 grams of a 37% solution of formaldehyde was added dropwise with stirring. After 5 hours at 40° C., the resulting solution was cooled in an ice-bath, and the pH of the solution was brought down to 7 by passing in sulfur dioxide. Sodium-2-nitrobutane-1-sulfonate was obtained from this solution by fractional crystallization.

Example III

A solution of potassium sulfite was prepared by dissolving 120 grams of potassium hydroxide in 300 milliliters of water and introducing sulfur dioxide until the pH reached 8. Then 75 grams of nitroethane was added to this solution. While stirring at 40° C., 81 grams of a 37% solution of formaldehyde was added. This mixture was stirred for 7 hours at 40° C. and then cooled in an ice-bath. Sulfur dioxide was bubbled into the solution until the pH was below 7 and crystalline potassium-2-nitropropane-1-sulfonate was obtained. After separation of the crystalline product, fractional crystallization of the filtrate yielded more product.

Example IV

A solution of potassium sulfite was made by dissolving 120 grams of potassium hydroxide in 180 milliliters of water and adding sulfur dioxide until a pH of 8 was reached. One mol (89 grams) of 1-nitropropane was added to the above solution, and then 72 grams of redistilled butyraldehyde was added while stirring. After heating the mixture with stirring for 2 hours at 80–90° C., a clear solution resulted. The solution was chilled to room temperature. Sulfur dioxide was introduced into the cooled solution until the pH was below 7. Fractional crystallization of this solution yielded the potassium 5-nitroheptane-4-sulfonate.

The invention is not restricted to the nitroalkanes of the specific examples. In general, any primary nitroalkane can be used. Herein, the expression "primary nitroalkane" is used in its usual manner, i. e. to designate a nitroalkane in which the nitro group is at the end of a paraffin chain and the carbon atom to which the nitro group is attached also carries at least two hydrogen atoms. Several illustrative examples of nitroalkanes which can be used are: nitromethane, nitroethane, 1-nitropropane, 1-nitrobutane, phenyl nitromethane, 2-phenyl-1-nitroethane, 2-phenyl-1-nitrobutane, etc.

Any aldehyde, either alkyl or aryl, can be used in the process. Several illustrative examples of aldehydes which can be used are: acetaldehyde, propionaldehyde, butyraldehyde, heptaldehyde, pelargonyl aldehyde, dodecyl aldehyde, benzaldehyde, phenylethyl aldehyde, isobutyraldehyde, chloral, citronellal, hydrocinnamaldehyde, sugar aldehydes, etc.

Any sulfite, such as any alkali metal, ammonium sulfite, or N-substituted ammonium sulfite which is water-soluble can be used in the process. Sodium sulfite, potassium sulfite, lithium sulfite, etc., are illustrative alkali metal sulfites which can be used. Illustrative N-substituted ammonium sulfites which can be used are the sulfites of the following N-substituted ammonium ions:

Any alkaloid,
Methyl ammonium,
Dimethyl ammonium,
Trimethyl ammonium,
Methyl dibenzyl ammonium,
Dimethyl benzyl ammonium,
Diethyl phenyl ammonium,
Cetyl dimethyl ammonium,
Quinolinium,
Pyridinium,
Morpholine,
N-methyl morpholine,
Ethyl diethanol ammonium,
Triethanol ammonium,
Piperidinium,
N-methyl piperidinium,
Etc.

It is to be noted that formaldehyde and ammonium sulfite should not be used together since the formaldehyde will react with the ammonium ion to form hexamethylene tetramine.

The preferred pH of the initial aqueous solution of the alkaline sulfite is between 6.3 and 8.5. However, it is to be understood that the invention is not restricted to such preferred pHs. In general, the reaction will take place at almost any initial pH of the alkali sulfite solution at 6 or above, depending upon the nitroalkane employed. For example, with 1-nitropropane good results have been obtained with an initial pH above 10. In general, when the lower nitroalkanes, and particularly nitromethane, are employed, the initial reaction medium should have a pH close to 6, such as 6.2 or 6.3, in order to avoid side reactions which the nitroalkane undergoes in the presence of aqueous alkali. The higher nitroalkanes are not as sensitive to alkali and the critical factor depends on the nature or sensitivity of the aldehyde involved in the reaction. In the event the pH of the initial aqueous alkaline sulfite solution is not as desired, such solution is appropriately treated to modify and adjust its pH to that desired. If desired, an aqueous solution of a mixture of a water-soluble sulfite and a water-soluble bisulfite, and having an initial pH as herein described, can be used.

The pH values herein referred to were determined with a pH meter having a glass electrode.

The conversion of the enol double salt is obtained by the acidification of the reaction mixture with an anhydride of a weak acid, such as sulfur dioxide, carbon dioxide, or any weak acid, such as acetic acid. When anhydrides of weak acids are used, the corresponding acid is formed in situ and functions as such. Upon acidification, the β-nitroalkane sulfonate is liberated and can be isolated from the reaction mixture in any convenient manner, such as by filtration, crystallization, fractional crystallization, etc.

In the specific examples, desired acidification of the reaction mixture is obtained when the pH thereof is reduced to 7 or lower. The precise pH to which the reaction mixture is reduced is not important so long as the reaction mixture has been reduced to a pH of 7 or lower. Preferably, the reaction mixture is reduced to a pH of below 7, such as between 6 and 7.

The reaction can be performed at temperatures ranging from 0° C. to 100° C., and the optimum temperature is determined by the nature of the particular nitroalkane and aldehyde selected for the reaction. The time required for the completion of the reaction can vary from about 30 minutes to about 6 or 8 hours, depending upon the constituents and the reaction temperature. In general, the higher the temperature at which the reaction is carried out the shorter the time necessary for completion of the reaction. The optimum temperature and time necessary for the completion of the reaction is determined by the quantity and reactivity of the aldehyde and nitroalkane employed. For example, when formaldehyde and nitromethane (the most reactive agents of the two representative groups) are used together, the reaction must be carried out at a temperature between 0° C. and 10° C. to obtain an isolatable product, and, when the reaction temperature is 10° C., the time necessary for completion of the reaction is about 6 to 8 hours, while, if the reaction temperature is lower, the reaction rate is decreased and a longer period of time is required for the reaction to go to completion. On the other hand, when formaldehyde and nitropropane are reacted in accordance with this invention, the optimum reaction temperature is between 40° C. to 60° C., the reaction time necessary for best yields at 60° C. being 1 hour, whereas the same reaction requires 5 hours at 40° C. When butyraldehyde and nitropropane are reacted in accordance with this invention, little or no reaction occurs below 70° C., while, at a reaction temperature of 80° C. to 90° C., 2 hours are required.

The optimum temperature and time conditions for the reaction between any of the reagents contemplated by this invention can be easily determined by simple empirical trials.

The reaction is not restricted to any particular sequence of addition of the reagents. Preferably, the nitroalkane is added to the aqueous alkaline sulfite solution of the proper pH value, and thereafter the aldehyde is added.

The invention is not restricted to any relative proportions of the reactants. However, optimum yields are obtained when the ratio of the reactants are: 1 mol of nitroalkane: 1 mol of aldehyde: 1 mol of alkaline sulfite. If it is desired to have any reagent in excess, then the alkaline sulfite should be in slight excess. Herein the term "enol double salt" is synonymous to "aci-salt."

The invention provides a method of producing salts of β-nitroalkane sulfonic acids in a relatively short period of time. It does not utilize any reagents which requires a long period of time for the preparation thereof.

Since it is obvious that various changes and modifications may be made in the above description without departing from the nature or spirit thereof, this invention is not restricted thereto except as set forth in the appended claims.

We claim:

1. A method of preparing salts of β-nitroalkane sulfonic acids which consists of reacting together a primary nitroalkane, an aldehyde and an aqueous solution of a sulfite in which the cation is selected from the group consisting of alkali metal, ammonium, and substituted ammonium ions and having a pH in excess of 6 to produce the aci-salt of the desired nitroalkane sulfonate, said aldehyde being other than formaldehyde when the cation of said sulfite is ammonium, adjusting the reaction mixture with a weak acid until it has a pH of not over 7 whereby said aci-salt is converted to the corresponding nitroalkane sulfonate, and removing said nitroalkane sulfonate from the reaction mixture.

2. A method of preparing salts of β-nitroalkane sulfonic acids which consists of reacting together a primary nitroalkane, an aldehyde and an aqueous alkali metal sulfite solution having a pH in excess of 6 to produce the aci-salt of the desired nitroalkane sulfonate, converting said aci-salt to the corresponding nitroalkane sulfonate, and removing said nitroalkane sulfonate from the reaction mixture.

3. A method of preparing salts of β-nitroalkane sulfonic acids which consists of reacting together a primary nitroalkane, an aldehyde and an aqueous alkali metal sulfite solution having a pH in excess of 6 to produce the aci-salt of the desired nitroalkane sulfonate, adjusting the reaction mixture with a weak acid until it has a pH of not over 7 whereby said aci-salt is converted to the corresponding nitroalkane sulfonate and removing said nitroalkane sulfonate from the reaction mixture.

4. A method of preparing salts of β-nitroalkane sulfonic acids which consists of reacting together a primary nitroalkane, an aldehyde and an aqueous alkali metal sulfite solution having a pH from 6.3 to 8.5 to produce the aci-salt of the desired nitroalkane sulfonate, converting said aci-salt to the corresponding nitroalkane sulfonate, and removing said nitroalkane sulfonate from the reaction mixture.

5. A method of preparing salts of β-nitroalkane sulfonic acids which comprises reacting together a primary nitroalkane, an aldehyde and an aqueous alkali metal sulfite solution having a pH from 6.3 to 8.5 to produce the aci-salt of the desired nitroalkane sulfonate, adjusting the reaction mixture with a weak acid until it has a pH of not over 7 whereby said aci-salt is converted to the corresponding nitroalkane sulfonate, and removing said nitroalkane sulfonate with the reaction mixture.

6. A method of preparing potassium-2-nitrobutane-1-sulfonate which consists of reacting together for one hour at 60° C. 1-nitropropane, formaldehyde, and an aqueous potassium sulfite solution having a pH of 6.5 cooling the reaction mixture, and passing sulfur dioxide into said mixture until the pH thereof is below 7.

7. A method of preparing alkali metal-2-nitrobutane-1-sulfonate which consists of reacting together at 40° C. 1-nitropropane, formaldehyde, and an aqueous solution of an alkali metal sulfite having a pH of 8, chilling the reaction mixture, and passing sulfur dioxide into said mixture until the pH thereof is not over 7.

8. A method of preparing potassium-5-nitroheptane-4-sulfonate which consists of reacting together for two hours at 80°–90° C. 1-nitropropane, butyraldehyde, and an aqueous solution of potassium sulfite having a pH of 8, cooling the reaction mixture, and then passing sulfur dioxide therein until the pH thereof is below 7.

MARVIN H. GOLD.
LEONARD J. DRUKER.

REFERENCES CITED

The following references are of record in the file of this patent:

FOREIGN PATENTS

| Number | Country | Date |
|---|---|---|
| 471,157 | Great Britain | Aug. 9, 1945 |

OTHER REFERENCES

Karrer, "Organic Chemistry," Nordeman Publishing Co. Inc., New York, N. Y., 1938, page 145.

Ind. and Eng. Chemistry (1), "Aldehyde-Nitroparaffin Condensation," vol. 32, pages 34–38, January 1940.

Chemical Reviews, "The Nitroparaffins," vol. 32, pages 373–430, June 1943.

Ind. and Eng. Chemistry (2), "Recent Developments on Nitroparaffins," vol. 35, pages 1146–1152, November 1943.

Certificate of Correction

August 2, 1949

Patent No. 2,477,870

MARVIN H. GOLD ET AL.

It is hereby certified that error appears in the printed specification of the above numbered patent requiring correction as follows:

Column 6, line 4, for the word "with" read *from*;

and that the said Letters Patent should be read with this correction therein that the same may conform to the record of the case in the Patent Office.

Signed and sealed this 10th day of January, A. D. 1950.

[SEAL]

THOMAS F. MURPHY,
*Assistant Commissioner of Patents.*